United States Patent Office 3,584,010
Patented June 8, 1971

3,584,010
1,1-ETHYLENEDIOXY-5-9-DIMETHYL-4,8-DECADIENE
Roman Marbet, Riehen, Switzerland, assignor to Givaudon Corporation, Clifton, N.J.
No Drawing. Application Dec. 6, 1967, Ser. No. 688,378, which is a continuation-in-part of application Ser. No. 380,927, July 7, 1964. Divided and this application Nov. 14, 1968, Ser. No. 775,915
Int. Cl. C07d 13/00
U.S. Cl. 260—340.9                            1 Claim

ABSTRACT OF THE DISCLOSURE 1,1-ethylenedioxy - 5,9 - dimethyl-4,8-decadiene which is useful as an odorant in the preparation of perfumes and other scented preparations.

CROSS REFERENCE TO RELATED APPLICATIONS

This application is a divisional application of Ser. No. 688,378, filed Dec. 6, 1967 which is a continuation-in-part of Ser. No. 380,927, filed July 7, 1964 now U.S. Pat. No. 3,381,039.

DETAILED DESCRIPTION OF THE INVENTION

The compound of this invention is a derivative produced by the acetalization and/or catalytic hydrogenation of γ,δ-unsaturated aldehydes having the general formula

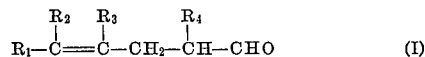

(I)

in which $R_1$ represents a hydrocarbon residue or an oxygen-containing hydrocarbon residue; $R_2$ represents a lower alkyl group; and wherein $R_1$ and $R_2$, taken together, represent a carbocyclic radical; $R_3$ represents a hydrogen atom or a lower alkyl group and $R_4$ represents a hydrogen atom or a lower hydrocarbon residue.

Representative of the hydrocarbon residues which, in Formula I, are depicted by the symbol $R_1$, are saturated aliphatic hydrocarbon residues having from 1 to 16 carbon atoms and unsaturated aliphatic hydrocarbon residues having from 2 to 16 carbon atoms. In a preferred embodiment of the invention, the symbol $R_1$ represents an alkyl or alkenyl group having a straight or branched chain, such as, a methyl, ethyl, propyl, isopropyl, butyl, isobutyl group or a group having the formula

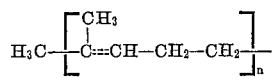

in which $n$ presents an integer from 1 to 3, and wherein the broken line represents an optional double bond.

Additionally, the symbol $R_1$, as it appears in Formula I, represents alkyl and alkenyl groups, of the type mentioned heretofore, having oxygen-containing substituents. Thus, for example, $R_1$ represents a hydrocarbon residue having free, esterified and etherified hydroxy groups, oxo groups or free or esterified carboxyl groups. The esterified hydroxy groups include, for example, acyloxy groups, the acyl residue of which is derived from a lower aliphatic or aromatic carboxylic acid, such as, formic acid, acetic acid, propionic acid, butyric acid, etc. or benzoic acid. The etherified hydroxy groups include, for example, lower alkoxy groups, such as, methoxy, ethoxy, propoxy, isopropoxy, etc. radicals; or aryloxy groups, such as a phenoxy radical. As examples of esterified carboxyl groups there can be mentioned carbalkoxy groups, the alkyl component of which is derived from a lower alkanol, such as, methanol, ethanol, propanol, etc. Additional examples of the groups represented by the symbol $R_1$ in Formula I are aromatic or araliphatic residues, such as, phenyl, benzyl, phenethyl, etc. radicals, as well as derivatives of such radicals having a oxygen-containing substituents. The latter derivatives include aromatic and araliphatic residues which contain free, etherified or esterified hydroxy groups or free or esterified carboxyl groups.

The symbol $R_2$, which appears in Formula I, represents an alkyl group having from 1 to 8 carbon atoms, such as, ethyl, propyl, butyl, pentyl, hexyl, etc. A preferred group of compounds of the invention contain, however, a methyl group as the $R_2$ substituent. The symbol $R_3$, which appears in Formula I, represents a hydrogen atom or an alkyl group having, for example, from 1 to 3 carbon atoms, such as, an ethyl or propyl radical. However, the preferred compounds of the invention contain a methyl group as the $R_3$ alkyl substituent.

Representative of the lower hydrocarbon residues which, in Formula I, are represented by the symbol $R_4$ are alkyl, cycloalkyl, aryl, and aralkyl groups having from 1 to 8 carbon atoms, such as, methyl, ethyl, propyl, cyclohexyl, allyl, pentyl, phenyl, benzyl, etc. radicals.

Additionally, $R_1$ and $R_2$ of Formula I, when taken together, represent a ring structure, such as a 5-member or a 6-member carbocyclic radical. For example, $R_1$ and $R_2$, taken together, represent a tetramethylene or pentamethylene group.

In the practice of this invention, the starting aldehydes of Formula I are, in a first step of the process, either acetalized to produce a γ,δ-unsaturated acetal of the following formula:

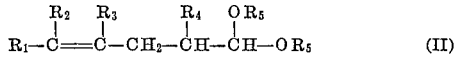

(II)

or hydrogenated to yield an aldehyde having the following formula:

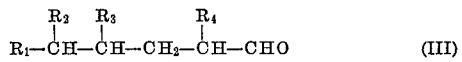

(III)

In a subsequent step of the process, the acetals of Formula II are hydrogenated or the aldehydes of Formula III are acetalized to yield a compound having the formula

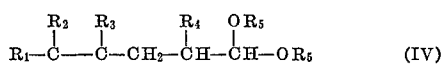

(IV)

In Formulas II, III and IV, the symbols $R_1$, $R_2$ and $R_3$ have the same meaning as in Formula I. The symbol $R_5$, which appears in Formulas II and IV represents a lower alkyl group, e.g., an alkyl group having from 1 to 6 carbon atoms or a lower alkenyl group, e.g. an alkenyl group having from 2 to 6 carbon atoms; taken together, the two symbols $R_5$ represent a lower alkylene group.

The preferred compounds of Formula IV contain as the $R_5$ substituents, lower alkyl groups, such as, methyl, ethyl, propyl, butyl, etc. groups. The lower alkylene group, which is represented by the symbols $R_5$ and $R_6$, include ethylene, trimethylene, tetramethylene, etc. radicals.

Acetalization of the aldehydes of Formula I or Formula III is effected in a known manner. In general, the acetalization is carried out in the presence of hydrogen ions, with the separation of the water which forms. The requisite hydrogen ion concentration can be provided, for example, by the use of acid catalysts, such as, anhydrous mineral acids; p-toluene sulphonic acid; cation exchangers, such as, phenol-resin sulphonic acids; ammonium chloride; zinc chloride; pyridine hydrochloride; sodium hydrogen sulphate; ferric chloride, boron trifluoride etherate; etc. The water, which is formed during the course of the reaction, can be removed from the reaction mixture by azeotropic distillation or by the addition of a water-binding agent, such as, an orthosilicic acid ester, an orthoformic acid ester, 2,2-dimethoxy-propane or dimethyl sulphite. Acetalization, which is effected by the reaction by the aldehyde of Formula I or III with an alcohol, especially a lower molecular weight primary alcohol, in admixture with orthoformic acid ethyl ester, has been found to be a convenient preparative step. In producing a dimethyl acetal or a dipropyl acetal, it has been found advisable to use an excess of the alcohol reactant, that is, methanol or propanol respectively, in an excess amount to avoid the formation of the diethyl acetal. Thus, for example, in the preparation of a dimethyl acetal or dipropyl acetal, it is preferred to use a large excess of alcohol, namely, from about 10 to about 20 moles of alcohol per mole of aldehyde. Acetalization of the aldehyde using a glycol, particularly using ethylene glycol, is effected quite readily, even in the absence of a water-binding agent.

In the hydrogenation step of the present process, one can use any catalyst which is normally used for the selective hydrogenation of the olefin bond of carbonyl-containing olefins. Suitable for use as the catalyst are, for example, palladium and Raney nickel. Using such a catalyst, the γ,δ-unsaturated aldehydes of Formula I are converted to the aldehydes of Formula III which are saturated in the γ,δ-position. The hydrogenation reaction is continued until such time as a calculated theoretical amount of hydrogen has been absorbed by the reaction mixture. If desired, this quantity of hydrogen used may be sufficient to hydrogenate also any other olefinic bonds, present in the aldehyde. In a preferred preparative method, acetone is used as a solvent for the reaction and a finely divided palladium oxide-palladium hydroxide mixture on carbon is used as the catalyst.

Hydrogenation of the acetals of Formula II is readily effected. Since it is well known that an acetal group is quite resistant to the reaction of the reducing agents, there can be used as the hydrogenation catalyst, in addition to palladium and Raney nickel, catalysts which are less selective in their activity. In all other respects, the hydrogenation of an acetal compound of Formula II can be effected in the conventional manner, at atmospheric pressure or higher.

The aldehydes of Formula I, which are used in the starting material in the practice of this invention, can be prepared by the acid-catalyzed reaction of a tertiary allyl alcohol of the formula

(V)

in which the symbols $R_1$, $R_2$ and $R_3$ have the same meaning as in Formula I with an aldehyde enol ether of the formula

(VI)

in which $R_4$ has the same meaning as in Formula I and $R_6$ represents a lower alkyl group. This reaction is effected with the splitting off of one mole of the alcohol represented by the formula $R_6OH$, in which the symbol $R_6$ has the same meaning as in Formula VI.

The novel compounds of Formulas II, III and IV have valuable and particularly useful properties. Because of their fine and, at times, usual fragrance, the compounds are useful as odorants in the preparation of perfumes and other scented preparations. In general, the compounds are characterized by a natural flowery note. The acetals of Formulas II and IV are especially useful for the perfuming of soap and other cosmetic preparations.

EXAMPLE 1

A solution of 140 mg. of p-toluenesulphonic acid in 280 ml. of methanol was added to a mixture of 28 grams of 5-methyl-4-hexen-1-al and 37 grams of orthoformic acid ethyl ester. The reaction was exothermic, the temperature of the reaction mixture reaching 33° C. After standing for a period of two hours, the reaction mixture was treated with 1.4 grams of sodium acetate and concentrated in a 50° C. bath at 35 mm. Distillation of the residue, in vacuo, yielded 1,1-dimethoxy-5-methyl-4-hexene, boiling point at 89° C. at 35 mm.; $n_D^{20}=1.4294$. The compound has a characteristic fruit-like green odor.

EXAMPLE 2

A mixture of 112 grams of 5-methyl-4-hexen-1-al, 62 grams of ethylene glycol and 0.2 grams of p-toluenesulphonic acid was distilled at 50 mm. in a 100° C.-bath. A major portion of water present therein was thus removed. Thereafter, the pressure was reduced to 12 mm. and there was thus obtained 1,1-ethylenedioxy-5-methyl-4-hexene [=1-(1,3-dioxolan-2-yl)-4-methyl-3-pentene] as a colorless oil which was purified by repeated distillation. This compound had a boiling point at 80° C. at 12 mm.; $n_D^{20}=1.4512$. The compound had an odor resembling 5-methyl-1-hexanal, but much finer.

EXAMPLE 3

63 grams of 2,5-dimethyl-4-hexen-1-al were mixed with 640 ml. of methanol, 75 grams of orthoformic acid ethyl ester and 1.5 ml. of boron trifluoride etherate. After 30 minutes the mixture was treated with 3 ml. of triethylamine and a fore-run was first distilled off at 13 mm. in a 50° C.-bath. Thereafter, there was obtained from a 100° C.-bath, 1,1 - dimethoxy - 2,5-dimethyl-4-hexene which was purified by redistillation. This compound, boiling point at 77° C. at 13 mm. and $n_D^{20}=1.4343$, had a harsh, fruit-like green odor.

EXAMPLE 4

63 grams of 2,5-dimethyl-4-hexen-1-al were mixed with 46 grams of ethanol, 75 grams of orthoformic acid ethyl ester and 1.7 ml. of boron trifluoride etherate. The temperature of the reaction mixture rose, exothermically, to 60° C. After two hours, the mixture was neutralized with 3.4 ml. of triethylamine and a fore-run was first distilled off at 14 mm. in a 50° C.-bath. Thereafter, 1,1-diethoxy-2,5-dimethyl-4-hexene was distilled off in a 120° C.-bath. The compound, boiling point at 92° C. at 14 mm. and $n_D^{20}=1.4321$, had an odor similar to that of 1,1-dimethoxy-2,5-dimethyl-4-hexene, but distinctly finer.

EXAMPLE 5

63 grams of 2,5-dimethyl-4-hexen-1-al were mixed with 650 ml. of n-propyl alcohol and 75 grams of orthoformic acid ethyl ester. The reaction was initiated by the addition of 1.5 ml. of boron trifluoride etherate. After two hours, 300 ml. of the reaction was evaporated off in a 120° C.-bath, following which the portion of the reaction mixture remaining was neutralized with 3 ml. of triethylamine. A fore-run was thereafter separated at 13 mm. in a 100° C.-bath. Subsequently, 1,1-di-n-propoxy-2,5 - dimethyl - 4-hexene was distilled off using 140° to 150° C.-bath. The compound, thus obtained, had a boiling point of 113° to 114° C. at 13 mm. and $n_D^{20}=1.4358$. It had an odor which was finer and more flowery than 1,1-diethoxy-2,5-dimethyl-4-hexene.

EXAMPLE 6

63 grams of 2,5-dimethyl-4-hexen-1-al were mixed with 700 ml. of n-butanol and 75 grams of orthoformic acid ethyl ester. Thereafter, 1.5 ml. of boron trifluoride etherate was added to the mixture and it was allowed to stand for a period of two hours, during which time the temperature thereof rose, exothermically, to 33° C. A 350 ml. of a fore-run was then distilled off in a 70° C.-bath at 13 mm. That portion of the reaction mixture which remained behind was thereafter neutralized with 3 ml. of triethylamine. A second fore-run was separated off in a 100° C.-bath at 13 mm. and, subsequently, 1,1-di-n-butoxy-2,5-dimethyl-4-hexene was distilled off in high vacuum. That compound, which had a boiling point at 70° C. at 0.015 mm. and $n_D^{20}=1.4392$, had a fresh-flowery, faint odor.

EXAMPLE 7

A mixture of 126 grams of 2,5-dimethyl-4-hexen-1-al, 62 grams of ethylene glycol and 0.18 gram of p-toluene sulphonic acid was first prepared. Water was distilled from this mixture at 50 mm. in a 100° C.-bath. Thereafter, the bath-temperature was increased to 130° C. and the 1,1-ethylendioxy-2,5-dimethyl-4-hexene which was thus formed, was distilled off. The compound had a boiling point of 120° C. at 50 mm. and $n_D^{20}=1.4531$. It had a fruit-like green odor with a fine cacao-like side-note.

EXAMPLE 8

A mixture of 180 g. of 5,9-dimethyl-4,8-decadien-1-al, 62 grams of ethylene glycol and 0.25 gram of p-toluenesulphonic acid was distilled, first in a 120° C.-bath at 13 mm. and then in high vacuum. There was thus obtained 1,1 - ethylenedioxy - 5,9 - dimethyl - 4,8-decadiene, boiling point at 91° C. at 0.02 mm. and $n_D^{20}=1.4738$. This compound had a pleasant mellow odor, reminiscent of that of 5,9-dimethyl-4,8-decadien-1-al, but is significantly finer and milder.

EXAMPLE 9

38 grams of 4-cyclohexylidene-1-butanal in 23 grams of ethanol and 38 grams of orthoformic acid ethyl ester were treated with 0.8 ml. of boron trifluoride etherate. The desired acetalization reaction proceeded, exothermically, up to a temperature of 57° C. The 1,1-diethoxy-4-cyclohexylidene-butane, which was thus formed was obtained by distillation in high vacuum. The compound, having a boiling point of 87° C. at 0.08 mm. and $n_D^{20}=1.4602$, had an original fresh-flowery odor.

EXAMPLE 10

56 grams of 2-pentyl-5-isobutyl-4-hexen-1-al in 23 grams of ethanol and 38 grams of orthoformic acid ethyl ester were treated with 1 ml. of boron trifluoride etherate and worked up after 2 hours. There was thus obtained 1,1-diethoxy-3-pentyl-5-isobutyl-4-hexene, boiling point at 98° C. at 0.08 mm. and $n_D^{20}=1.4452$, having a faintly fatty odor.

EXAMPLE 11

A mixture of 46 grams of 5-methyl-7-acetoxy-4-hepten-1-al, 15.5 grams of ethylene glycol and 60 mg. of p-toluene sulphonic acid was maintained at 13 mm. in a 120° C. bath. Thereafter, the 1,1-ethylenedioxy-5-methyl-7-acetoxy-4-heptene which was thus formed, was recovered by distillation in high vacuum. The compound, having a boiling point of 92° C. at 0.05 mm. and $n_D^{20}=1.4628$, had a faint, fresh odor.

EXAMPLE 12

42.5 grams of 5,9-dimethyl-9-methoxy-4-decen-1-al in 20 grams of ethanol and 30 grams of orthoformic acid ethyl ester were treated with 1 ml. of boron trifluoride etherate and worked up after a period of about two hours. There was, thus obtained, 1,1-diethoxy-5,9-dimethyl-9-methoxy-4-decene, boiling point at 105° C. at 0.07 mm. and $n_D^{20}=1.4476$, having a smoky, faintly flowery-fatty odor.

EXAMPLE 13

28 grams of 5-methyl-4-hexen-1-al were mixed with 140 ml. of acetone. Thereafter, the mixture was treated with 2.8 grams of 5 percent palladium-carbon (finely divided palladium oxide-hydroxide mixture on carbon). Such mixture was then shaken for a period of 15 hours in a hydrogen atmosphere. During the reaction, about 5.5 liters of hydrogen were taken up. Subsequently, the reaction mixture was filtered under an atmosphere of nitrogen gas to remove the catalyst therefrom and the acetone was distilled off in a 50° C.-bath at 100 mm. The crude 5-methyl-1-hexanal, thus obtained, was purified by distillation. The compound, boiling point at 84° C. at 100 mm. and $n_D^{20}=1.4104$, had a strong, fruit-like odor.

EXAMPLE 14

31.5 grams of 2,5-dimethyl-4-hexen-1-al were dissolved in 150 ml. of acetone, treated with 3.1 g. of a palladium-carbon catalyst, identical to that described in Example 13, and the mixture was shaken in a hydrogen atmosphere. Approximately 2.5 liters of hydrogen were taken up within one hour. Thereafter, an additional 3.1 grams of palladium-carbon catalyst were added to the mixture, under an atmosphere of nitrogen gas, and the hydrogenation was continued for a period of 8 hours. During that time an additional 3 liters of hydrogen were taken up. There was, thus obtained, 2,5-dimethyl-1-hexanal, boiling point at 47° C. at 13 mm. and $n_D^{20}=1.4142$, having a fine and fruit-like odor.

EXAMPLE 15

45 grams of 5,9-dimethyl-4,8-decadien-1-al in 220 ml. of acetone were hydrogenated by the procedure described in Example 14. About 11 liters of hydrogen were taken up. Pure 5,9-dimethyl-1-decanal was obtained after the usual working up and distillation in high vacuum. The compound, boiling at 55° C. at 0.06 mm. and $n_D^{20}=1.4348$, had a typical aldehydic long lasting odor with a new and interesting note.

EXAMPLE 16

38 grams of 4-cyclohexylidene-1-butanal in 200 ml. of acetone were hydrogenated, two times, using 3.8 grams of palladium-carbon catalyst, by the method described in Example 14. About 5.5 liters of hydrogen were taken up. The desired 5-cyclohexyl-1-butanal was obtained as a colorless oil after the usual working up and distillation in high vacuum. The compound, having a boiling point at 55° C. at 0.15 mm. and $n_D^{20}=1.4595$, had a complex odor which was fruit-like green and faintly aldehydic.

EXAMPLE 17

25 grams of 5,9-dimethyl-9-hydroxy-4-decen-1-al in 150 ml. of acetone were hydrogenated in the presence of 2.5 grams of 5 percent palladium-carbon catalyst as described in Example 13. About 3 liters of hydrogen were taken up. There was thus obtained 5,9-dimethyl-9-hydroxy-1-decanal as a colorless oil after the usual working up and distillation in high vacuum. The compound had a boiling point at 99° C. at 0.04 mm. and $n_D^{20}=1.4573$ and a faint, but pleasant, fresh-flowery odor.

EXAMPLE 18

26.5 grams of 5,9-dimethyl-9-methoxy-4-decen-1-al in 150 ml. of caetone were hydrogenated in the presence of 2.6 grams of 5 percent palladium-carbon catalyst, as described in Example 13. About 3 liters of hydrogen were taken up. After the customary working up, there was obtained 5,9-dimethyl-9-methoxy-1-decanal, boiling point at 78° C. at 0.03 mm. and $n_D^{20}=1.4442$. The compound had a fine and flowery odor.

EXAMPLE 19

(a) 32 grams of 2,5-dimethyl-1-hexanal, produced as described in Example 14, were worked up by the method of Example 1 with 37 grams of orthoformic acid ethyl ester, 280 ml. of methanol and 140 mg. of p-toluene sulphonic acid. There was thus obtained, 1,1-dimethoxy-2,5-dimethyl-hexane, boiling point at 72° C. at 13 mm. and $n_D^{20}=1.4154$, having a flowery, slightly fruit-like green odor.

(b) The same compound was obtained by the hydrogenation of 1,1-dimethoxy-2,5-dimethyl-4-hexene by the process described in Example 13. The starting 1,1-dimethoxy-2,5-dimethyl-4-hexene was produced as described in Example 3.

I claim:
1. 1,1-ethylenedioxy-5,9-dimethyl-4,8-decadiene.

References Cited

Asprey et al., "Journ. Amer. Chem. Soc.," vol. 89(1), 1967, pp. 170–2.

ALEX MAZEL, Primary Examiner

J. H. TURNIPSEED, Assistant Examiner

U.S. Cl. X.R.

260—338, 340.7, 598, 601, 602, 611, 615; 424—278.